United States Patent
Kramer

(10) Patent No.: US 9,198,529 B2
(45) Date of Patent: Dec. 1, 2015

(54) FLOWER POT PROTECTOR FOR OUTDOOR/INDOOR PLANTERS

(71) Applicant: Laura Jean Kramer, Danville, IN (US)

(72) Inventor: Laura Jean Kramer, Danville, IN (US)

( * ) Notice: Subject to any disclaimer, the term of this patent is extended or adjusted under 35 U.S.C. 154(b) by 15 days.

(21) Appl. No.: 13/958,507

(22) Filed: Aug. 2, 2013

(65) Prior Publication Data

US 2015/0033621 A1 Feb. 5, 2015

(51) Int. Cl.
 A47G 7/08 (2006.01)
 A01G 13/04 (2006.01)

(52) U.S. Cl.
 CPC . *A47G 7/08* (2013.01); *A01G 13/04* (2013.01)

(58) Field of Classification Search
 CPC ...... A01G 13/04; A01G 13/043; A47G 7/087
 USPC .......................... 47/20.1; 220/739; 206/316.1
 See application file for complete search history.

(56) References Cited

U.S. PATENT DOCUMENTS

| | | | | |
|---|---|---|---|---|
| 117,265 A * | 7/1871 | Slade | | 68/94 |
| 436,183 A * | 9/1890 | Moore | | 47/31 |
| 1,021,447 A * | 3/1912 | Carstons | | 47/20.1 |
| 1,074,828 A * | 10/1913 | Bigelow | | 47/31 |
| 1,584,302 A * | 5/1926 | Kakiuchi | | 47/29.5 |
| 1,641,244 A * | 9/1927 | Woodruff | | 47/31.1 |
| 1,834,084 A * | 12/1931 | Barnes | | 47/23.2 |
| 1,975,752 A * | 10/1934 | Chase et al. | | 47/29.7 |
| 2,665,523 A * | 1/1954 | Hardman | | 47/31.1 |
| 3,738,529 A * | 6/1973 | Rose | | 220/739 |
| 4,177,894 A * | 12/1979 | Petersen | | 206/316.1 |
| 4,383,565 A * | 5/1983 | Denmat | | 206/316.1 |
| 5,609,265 A * | 3/1997 | Haberkorn et al. | | 220/694 |
| D429,047 S * | 8/2000 | Hirtel | | D32/53 |
| 8,167,165 B1 * | 5/2012 | Peterson | | 220/739 |
| 2003/0041514 A1 * | 3/2003 | Hazeltine | | 47/58.1 SC |
| 2004/0128911 A1 * | 7/2004 | Weder | | 47/72 |
| 2009/0293349 A1 * | 12/2009 | Dunbar | | 47/20.1 |
| 2012/0291344 A1 * | 11/2012 | Castagno et al. | | 47/29.1 |

* cited by examiner

*Primary Examiner* — Rob Swiatek
*Assistant Examiner* — Magdalena Topolski
(74) *Attorney, Agent, or Firm* — Kyle S. Brant

(57) ABSTRACT

A protective covering assembly for use with outdoor flower pots is disclosed. The assembly includes a top portion conforming generally in shape with and slightly larger than the upper rim of a flower pot. The top portion includes a pocket or opening on the underside thereof into which a disk shaped support member is inserted. A skirt extends downward from the top portion and includes a vertical slit on one side. A closure mechanism is attached adjacent the slit that retains the slit in a closed position as desired. The top portion and skirt are constructed of waterproof fabric or marine grade vinyl.

10 Claims, 3 Drawing Sheets

FLOWER POT PROTECTOR FOR OUTDOOR/INDOOR PLANTERS

FIELD OF THE INVENTION

The present invention relates in general to outdoor flower pots and more particularly to a protective cover for such pots.

BACKGROUND OF THE INVENTION

Flower pots that remain outdoors during winter months often times are damaged due to freeze-thaw cycles wherein water that remains in the pot or soil within the pot freezes, expands, and induces cracks in the pot. One solution to this problem is to empty the pots of any soil or dirt prior to the onset of freezing cold weather. Another well known solution is to move the pots indoors or into an environment wherein freezing temperatures are not encountered. Neither solution is accomplished without some considerable effort. What is needed is a protective cover for flower pots and the like that protects the flower pot from inclement weather and prevents moisture accumulation therein and also prevents collection of plant debris such as leaves and prevents animals from digging in the soil or eating the plant or plant bulbs therein.

SUMMARY OF THE INVENTION

A covering assembly, according to one aspect of the present invention comprises a top portion oriented horizontally and constructed from waterproof flexible material, the top portion including a periphery, a rigid planar support member attached to the top portion and having a shape conforming to the shape of the top portion, a skirt portion made from waterproof flexible material and having a slit, the skirt portion attached about the periphery of the top portion and extending down from the periphery of the top portion; and a closure means attached to the skirt portion and adapted to releasably close at least a portion of the slit.

One object of the present invention is to provide a protective cover for outdoor flower pots.

Another object of the invention is to prevent moisture from accumulating in an outdoor flower pot as a result of precipitation.

Still another object of the present invention is to protect outdoor flower pots from hail and ice damage.

These and other objects of the present invention will become more apparent from the following description of the preferred embodiments.

DETAILED DESCRIPTION OF THE INVENTION

Figure 1:
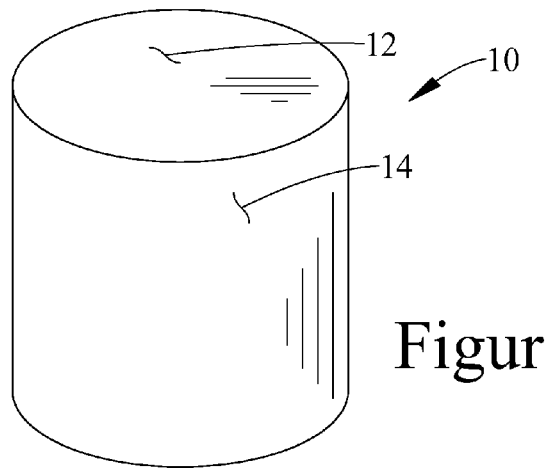
FIG. 1 is a front perspective view of a covering assembly according to one embodiment of the present invention.
Figure 2:
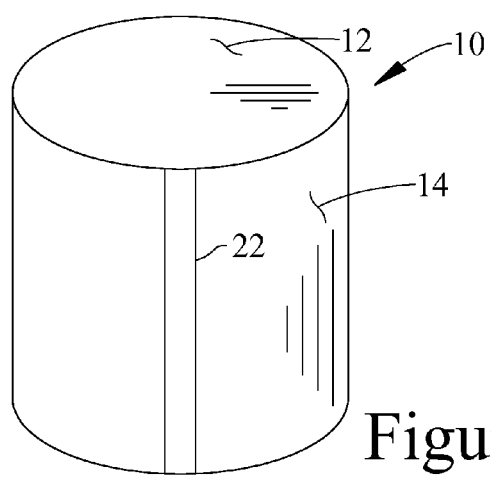
FIG. 2 is a rear perspective view of the covering assembly of FIG. 1.
Figure 3:
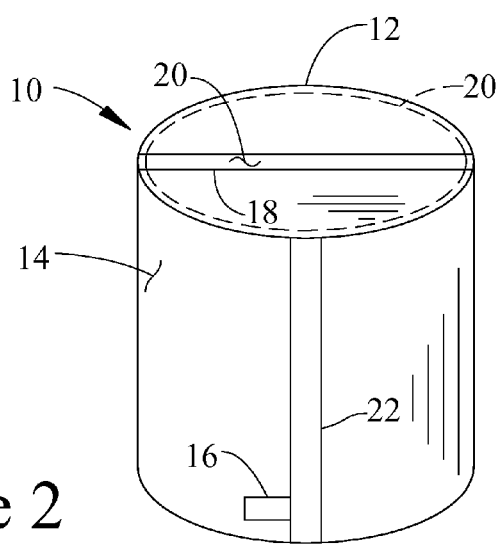
FIG. 3 is an inside out perspective view of the covering assembly of FIG. 1.

The following detailed description is of the best currently contemplated modes of carrying out exemplary embodiments of the invention. The description is not to be taken in a limited sense, but is made merely for the purpose of illustrating the general principles of the invention, since the scope of the invention is best defined by the appended claims.

Various inventive features are described below that can each be used independently of one another or in combination with other features.

A covering assembly 10 according to an embodiment of the present invention is shown in FIGS. 1-8. The covering assembly 10 includes a circular top portion 12, a skirt portion 14 attached to top portion 12 and extending downward therefrom, and a closure mechanism 16.

For some embodiments, top portion 12 comprises two layers of waterproof fabric oriented in a horizontal place as shown and is circular in shape. For some alternate embodiments not shown, top portion 12 may comprise other geometric shapes, such as square, rectangular or oval. The shape of top portion 12 may vary and depends on the shape of the planter pot over which device 10 is situated.

Figure 4:
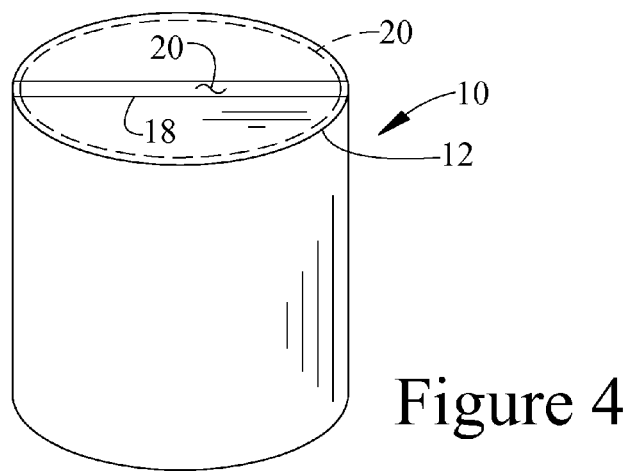
FIG. 4 is another inside out perspective view of the top portion shown in FIG. 1.
Figure 5:
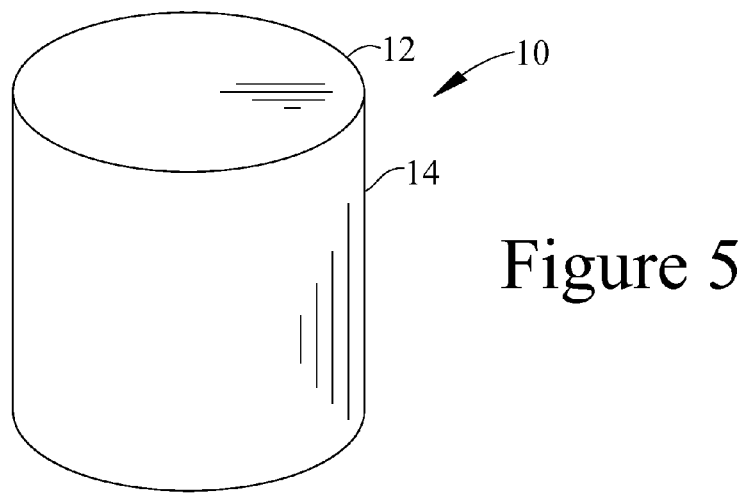
FIG. 5 is another front perspective view of the covering assembly of FIG. 1.
Figure 6:
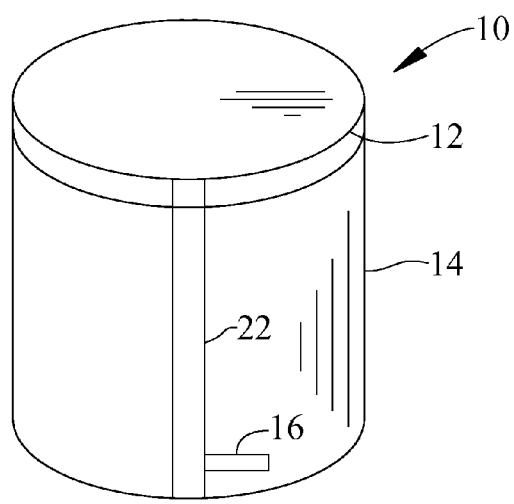
FIG. 6 is a rear perspective view of the covering assembly of FIG. 5.
Figure 7:
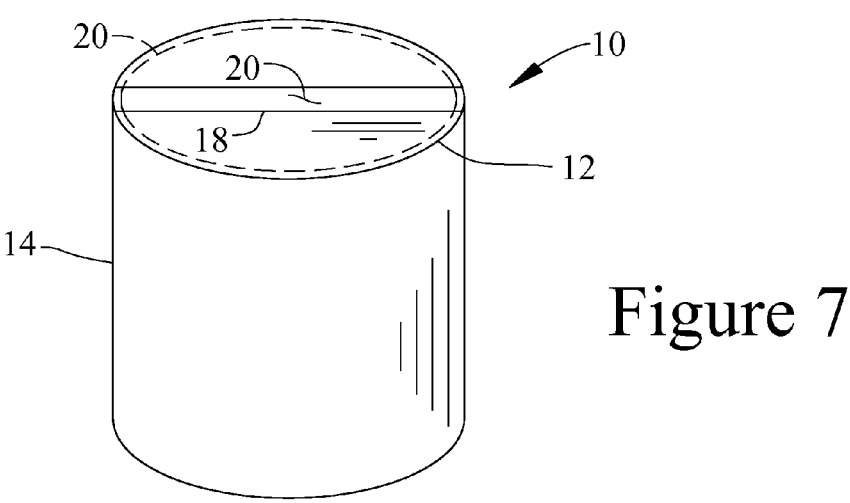
FIG. 7 is an inside out view of the covering assembly of FIG. 5.
Figure 8:
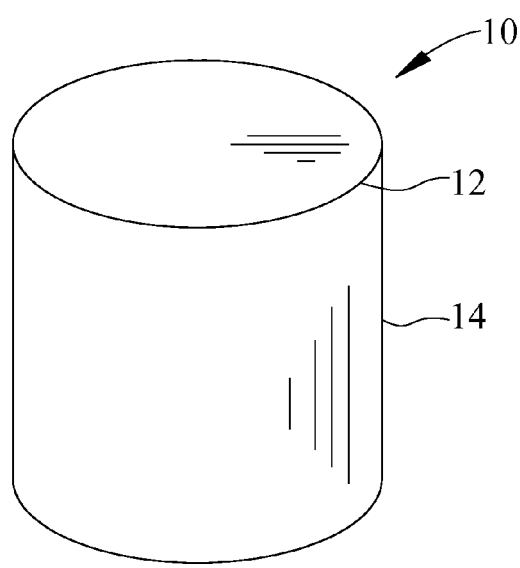
FIG. 8 is another front perspective view of the covering assembly of FIG. 1.

Top portion 12 includes an opening 18 located on the underside thereof, as shown in FIGS. 4 and 7. Opening 18 is configured to receive disk shaped support member 20, preferably made from a plastic material. For some embodiments, opening 18 may include a hook and loop fastener 16, such as Velcro® brand fasteners. Support member 20 is a plastic circular structure sized to fit on the rim of a planter pot (not shown). Support member 20 has a diameter between about 6 inches and about 72 inches to correspond with the size of the upper rim of a planter pot, though other sizes are also contemplated. Support member 20 may comprise other shapes, such as square rectangular or oval. Support member 20 is inserted into opening 18 and is designed to hold or maintain top portion 12 of covering assembly 10 on top of a planter pot.

Skirt portion 14 is attached to top portion 12. For some embodiments, skirt portion 14 is sewn to top portion 12. Skirt portion 14 may be fabricated from water proof fabric or marine grade vinyl. Skirt portion 14 is configured to hang down or extend downward from top portion 12 and is designed to extend over and cover the sides of a planter pot. For some embodiments, skirt portion 14 may have a length between about 6 inches and about 72 inches. Skirt portion 14 includes slit 22 for ease of use in positioning device 10 over a planter pot.

Closure mechanism 16 is attached to skirt portion 14 and is designed to maintain slit 22 in a closed position during use of device 10. Closure mechanism 16 is designed to releasably close at least a portion of slit 22. For some embodiments, closure mechanism 16 may comprise a hook and loop fastener, such as Velcro®. Alternative fasteners that may be substituted for closure mechanism 16 include zippers, buttons or ties.

Broadly, an embodiment of the present invention generally provides a covering assembly for an outdoor planter pot. Embodiments of the present invention may resemble mushrooms and may be used in place of unattractive plastic bags to protect planter pots from outdoor elements.

Embodiments of the present invention may comprise decorative waterproof planter pot covers for indoor and outdoor use. Embodiments of the water proof planter pot covers 10 can be used on different styles and shapes of planter pots.

Embodiments of the present invention are used to shield outdoor planter pots from the seasonal weather elements. Embodiments of the present invention may comprise decorative planter pot covers that can be useful.

It should be understood, of course, that the foregoing related to exemplary embodiments of the invention and the modifications may be made without departing from the spirit and scope of the invention as set forth in the following claims.

What is claimed is:

1. A covering assembly comprising:
   a top portion oriented horizontally and constructed from waterproof flexible material, said top portion including a periphery;
   a rigid planar support member attached to said top portion and having a shape conforming to the shape of said top portion;
   a skirt portion made from waterproof flexible material and having a slit, said skirt portion attached about the periphery of said top portion and extending down from the periphery of said top portion; and
   closure means disposed adjacent said slit and attached to said skirt portion for releaseably closing said slit wherein said top portion includes an upper layer and a lower layer of waterproof material, and wherein said lower layer includes an aperture therein, and wherein said rigid planar support member is disposed between said upper layer and said lower layer in said aperture.

2. The covering assembly of claim 1 wherein said closure means is a hook and loop fastener.

3. The covering assembly of claim 1 wherein said top portion and said skirt portion are fabricated from marine grade vinyl.

4. The covering assembly of claim 1 wherein said top portion and said skirt portion are fabricated from waterproof cloth.

5. The covering assembly of claim 1 wherein said top portion is circular in shape.

6. A covering assembly comprising:
   a planar portion oriented in a horizontal plane and including two adjacent layers of flexible waterproof material, said planar portion including a pocket formed in the lower of said two adjacent layers, said planar portion also including a periphery;
   a rigid planar support member having a shape conforming to said planar portion, said rigid planar support member disposed within said pocket; and
   a skirt portion attached to and about the periphery of said planar portion and extending downward therefrom, said skirt portion constructed from flexible waterproof material.

7. The covering assembly of claim 6 wherein said skirt portion includes a vertical slit and said covering assembly further including a closure mechanism attached to said skirt portion adjacent said slit.

8. The covering assembly of claim 7 wherein said skirt portion and said planar portion are fabricated from waterproof cloth and said closure mechanism is a hook and loop fastener.

9. The covering assembly of claim 7 wherein said skirt portion and said planar portion are fabricated from marine grade vinyl and said closure mechanism is a hook and loop fastener.

10. The covering assembly of claim 7 wherein said closure mechanism is a hook and loop fastener.

* * * * *